US012614687B2

(12) United States Patent
Yao et al.

(10) Patent No.: US 12,614,687 B2
(45) Date of Patent: Apr. 28, 2026

(54) RELAY

(71) Applicant: BYD COMPANY LIMITED, Guangdong (CN)

(72) Inventors: Baotong Yao, Shenzhen (CN); Qiang Shen, Shenzhen (CN); Lujian Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 270 days.

(21) Appl. No.: 18/372,470

(22) Filed: Sep. 25, 2023

(65) Prior Publication Data

US 2024/0021388 A1 Jan. 18, 2024

Related U.S. Application Data

(63) Continuation of application No. PCT/CN2022/088781, filed on Apr. 24, 2022.

(30) Foreign Application Priority Data

Apr. 27, 2021 (CN) ......................... 202110458447.3

(51) Int. Cl.
*H01H 50/04* (2006.01)
*H01H 50/02* (2006.01)
(Continued)

(52) U.S. Cl.
CPC ........ *H01H 50/047* (2013.01); *H01H 50/021* (2013.01); *H01H 50/14* (2013.01); *H01H 50/64* (2013.01); *H01H 2050/049* (2013.01)

(58) Field of Classification Search
CPC .... H01H 50/047; H01H 50/021; H01H 50/14; H01H 50/64; H01H 2050/049;
(Continued)

(56) References Cited

U.S. PATENT DOCUMENTS

2002/0135447 A1 9/2002 Gruner
2004/0168666 A1 9/2004 Nagai et al.
(Continued)

FOREIGN PATENT DOCUMENTS

CN 203415500 U 1/2014
CN 205428837 U * 8/2016
(Continued)

OTHER PUBLICATIONS

International Search Report and Written Opinion for Application No. PCT/CN2022/088781, mailed on Jul. 4, 2022, 10 pages.
(Continued)

*Primary Examiner* — Shawki S Ismail
*Assistant Examiner* — Lisa N Homza
(74) *Attorney, Agent, or Firm* — Sheppard Mullin Richter & Hampton LLP

(57) ABSTRACT

A relay, includes a housing and multiple contact modules. An interior of the housing has an accommodation space, and each contact module includes a terminal assembly, a movable contact plate, and a drive assembly. The terminal assembly includes two terminals spaced apart and disposed on the housing. The terminal at least partially extends into the accommodation space to form a static contact. The movable contact plate is movably disposed in the accommodation space, and is configured to contact two static contacts to conduct the two terminals. The drive assembly includes a drive shaft and a drive unit that drives the drive shaft. The drive shaft is connected to the movable contact plate, and the drive unit is configured to drive the movable contact plate via the drive shaft. Multiple drive shafts corresponding to the multiple contact modules are disposed coaxially, and are relatively movable in their axial direction.

13 Claims, 4 Drawing Sheets

A-A

(51) Int. Cl.
*H01H 50/14* (2006.01)
*H01H 50/64* (2006.01)

(58) Field of Classification Search
CPC .... H01H 50/543; H01H 50/546; H01H 45/02; H01H 45/14
USPC .......................................................... 335/133
See application file for complete search history.

(56) References Cited

U.S. PATENT DOCUMENTS

| | | | | |
|---|---|---|---|---|
| 2016/0293368 | A1 | 10/2016 | Tanaka et al. | |
| 2020/0373111 | A1* | 11/2020 | Zhong | H01H 50/02 |

FOREIGN PATENT DOCUMENTS

| | | | |
|---|---|---|---|
| CN | 107204255 | A | 9/2017 |
| CN | 111863538 | A | 10/2020 |
| CN | 111883391 | A | 11/2020 |
| DE | 102009052626 | A1 | 5/2011 |
| EP | 3432337 | A1 | 1/2019 |
| JP | 2014086284 | A | 5/2014 |
| JP | 2019-140207 | A | 8/2019 |
| WO | 2017146482 | A1 | 8/2017 |

OTHER PUBLICATIONS

Written Decision on Registration (Allowance) dated Aug. 13, 2025, issued in related Korean Patent Application No. 10-2023-7030968, with English machine translation (4 pages).

* cited by examiner

A-A

B-B

RELAY

CROSS-REFERENCE TO RELATED APPLICATIONS

This application is a Continuation Applications of International Patent Application No. PCT/CN2022/088781, filed on Apr. 24, 2022, which is based on and claims priority to and benefits of Chinese Patent Application No. 202110458447.3, filed on Apr. 27, 2021. The entire content of all of the above-referenced applications is incorporated herein by reference.

FIELD

The present disclosure relates to the technical field of electrical equipment, and more particularly, to a relay.

BACKGROUND

Relays are basic elements used to control and switch direct current loads in the industrial control field, and are widely used.

In the related art, a relay generally uses one-contact control. One relay can control only one control circuit. Multiple relays need to be arranged for control of multiple control circuits, for example, a charging circuit and a pre-charging circuit of an electric vehicle. A distribution module arranged with multiple relays will take up more space and raise production costs.

SUMMARY

The present disclosure aims to resolve a technical problem in the related art that "multiple relays need to be arranged for control of multiple control circuits", and effectively reduce a space occupied by a distribution module.

The present disclosure provides a relay, including a housing and multiple contact modules. The housing has an accommodation space. Multiple drive shafts respectively correspond to the multiple contact modules and are disposed coaxially, and the multiple drive shafts are movable in an axial direction of the drive shafts. Each of the contact modules includes: a terminal assembly, including two terminals spaced apart from each other and disposed on the housing. Each of the two terminal at least partially extends into the accommodation space to form one of two static contacts. A movable contact plate, movably disposed in the accommodation space. The movable contact plate is configured to contact the two static contacts to electrically couple the two terminals. A drive assembly, including a drive shaft of the multiple drive shafts and a drive unit that drives the drive shaft. The drive shaft is connected to the movable contact plate, and the drive unit is configured to drive the movable contact plate via the drive shaft to contact or be separated from the two terminals.

In an embodiment, the multiple drive shafts include a central shaft and at least one sleeve shaft, the at least one sleeve shaft is a hollow cylinder, and the at least one sleeve shaft is sleeved on the central shaft to implement relative movement of the multiple drive shafts.

In an embodiment, the housing includes a top plate, and multiple terminal assemblies respectively corresponding to the multiple contact modules are staggered on the top plate, so that on/off between the multiple contact modules does not affect each other.

In an embodiment, a first terminal corresponding to the at least one sleeve shaft extends into the accommodation space by a first extension length, a second terminal corresponding to the central shaft extends into the accommodation space by a second extension length, and the first extension length is greater than the second extension length.

In an embodiment, the housing includes a top plate, a bottom plate, and multiple side plates connected between the top plate and the bottom plate, and the top plate, the bottom plate, and the multiple side plates form the accommodation space; the drive unit is disposed in the accommodation space, the drive unit includes an iron core and a drive coil, the iron core is disposed at an end of the drive shaft away from the movable contact plate, and the drive coil is configured to drive the iron core to move in the axial direction; and a first drive coil corresponding to the at least one sleeve shaft and a second drive coil corresponding to the central shaft are staggered in the axial direction, and the second drive coil is disposed closer to the bottom plate than the first drive coil.

In an embodiment, the at least one sleeve shaft includes multiple sleeve shafts, and the multiple sleeve shafts are successively sleeved on the central shaft in a radial direction of the central shaft.

In an embodiment, a terminal corresponding to the sleeve shafts extends into the accommodation space by an extension length, a third extension length of the terminal corresponding to a first sleeve shaft that is closer to the central shaft in the radial direction of the central shaft is shorter than a fourth extension length of the terminal corresponding to a second sleeve shaft that is farther from the central shaft in the radial direction of the central shaft.

In an embodiment, the housing includes a top plate, a bottom plate, and multiple side plates connected between the top plate and the bottom plate, and the top plate, the bottom plate, and the multiple side plates enclose to form the accommodation space; the drive unit is disposed in the accommodation space, the drive unit includes an iron core and a drive coil, the iron core is disposed at an end of the drive shaft away from the movable contact plate, and the drive coil is configured to drive the iron core to move in the axial direction; and multiple drive coils corresponding to the multiple contact modules are staggered in the axial direction, a first drive coil corresponds to a sleeve shaft that is closer to the central shaft in the radial direction of the central shaft, a second drive coil corresponds to a sleeve shaft that is farther from the central shaft in the radial direction of the central shaft, a third drive coil corresponds to the central shaft, a distance between the bottom plate and the third drive coil is shorter than those between the bottom plate and the first drive coil and the second drive coil, and the first drive coil is closer to the third drive coil than the second drive coil.

In an embodiment, the relay includes a first resistor, wherein the multiple contact modules include a first contact module and a second contact module, the first contact module includes a first terminal and a second terminal, the second contact module includes a third terminal and a fourth terminal, the first terminal is electrically connected to the third terminal via the first resistor, and the second terminal is electrically connected to the fourth terminal.

In an embodiment, the relay further includes a second resistor, and the third terminal is electrically connected to the fourth terminal via the second resistor.

In an embodiment, the first resistor is disposed on the housing.

In an embodiment, the first resistor is printed on the housing.

In an embodiment, the housing includes a top plate and a side plate, the first terminal, the second terminal, the third terminal, and the fourth terminal are disposed on the top plate, the side plate has multiple planes, and the first resistor is disposed on at least one of the planes.

In an embodiment, the housing is a ceramic housing capable of providing excellent sealing and insulation properties.

In conclusion, the present disclosure provides a relay, including a housing and multiple contact modules, multiple drive shafts corresponding to the multiple contact modules are disposed coaxially, and the multiple drive shafts are movable with respect to each other in their axial direction. Therefore, the relay may separately control different movable contact plates to move via different drive units, independently control on/off of different control circuits, and occupy a space of about one original relay, thereby facilitating reducing the weight and costs.

BRIEF DESCRIPTION OF THE DRAWINGS

The foregoing and/or additional aspects and advantages of the present disclosure will become apparent and comprehensible from the following descriptions of the embodiments with reference to the accompanying drawings, where.

Figure 1:
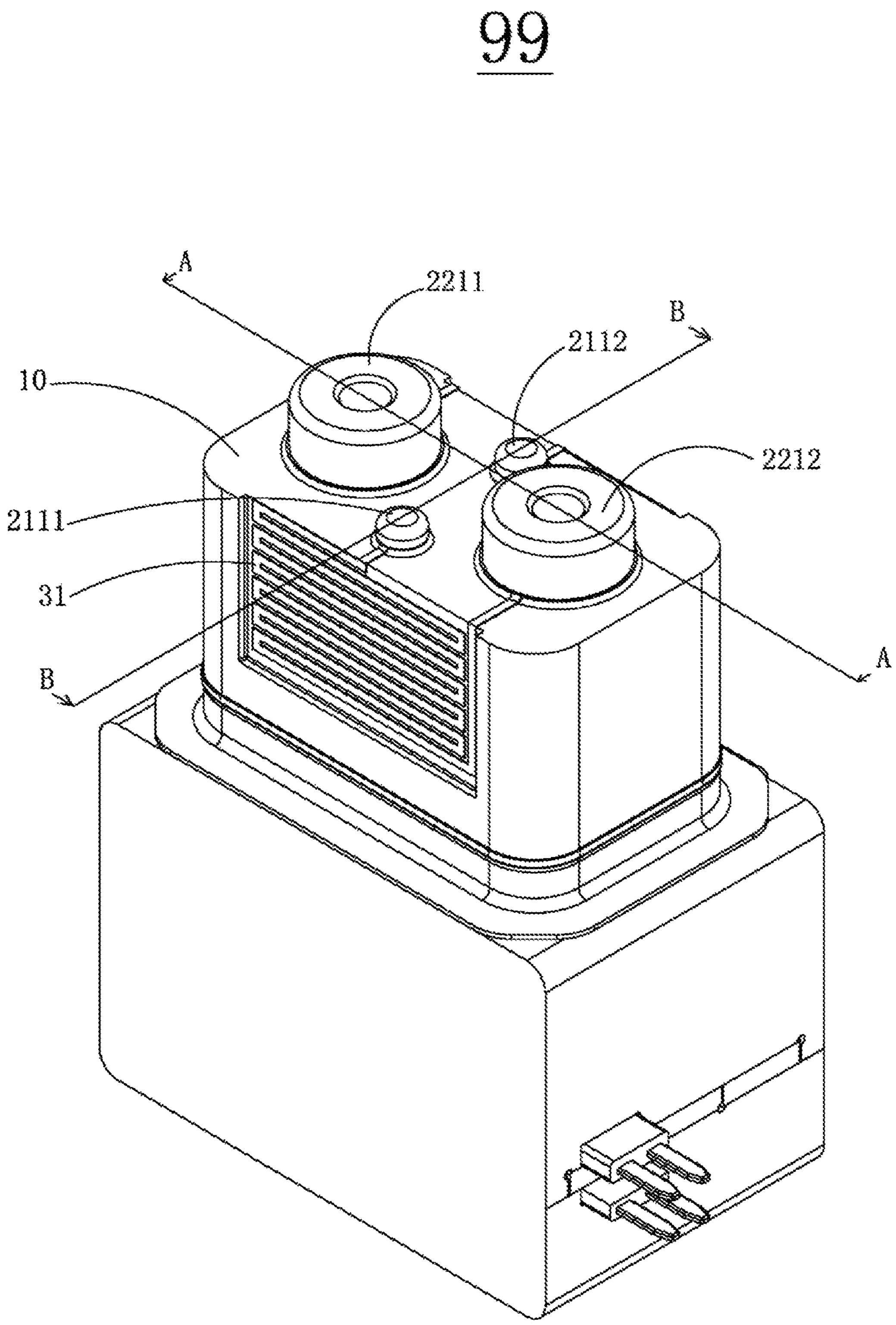
FIG. 1 is a perspective view of a relay according to an implementation of the present disclosure.
Figure 2:
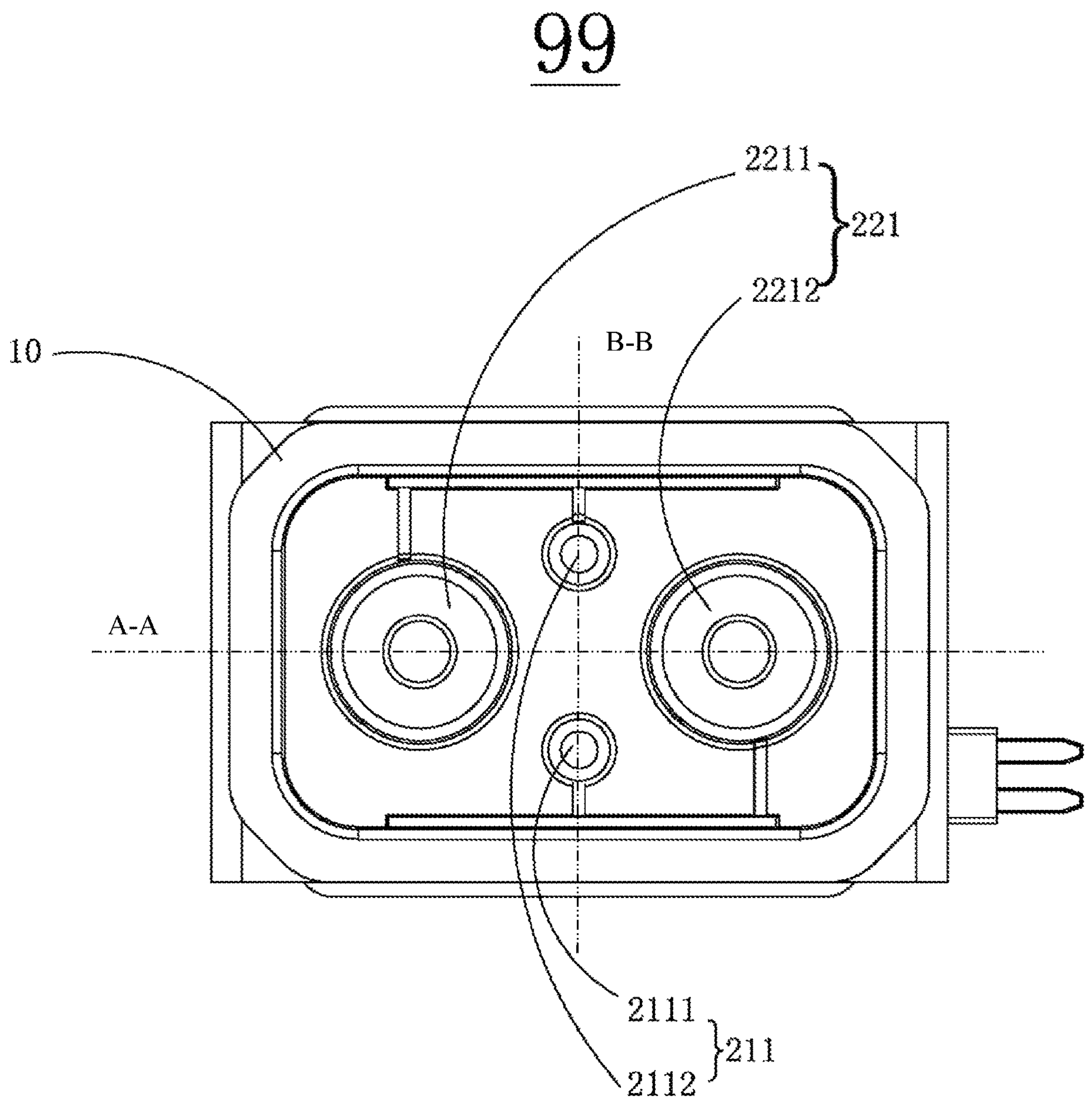
FIG. 2 is a top view of the relay shown in FIG. 1.

REFERENCE NUMERALS relay 99;

housing 10, top plate 101, bottom plate 103, side plate 105, and accommodation space 11;

first contact module 21, first terminal assembly 211, first terminal 2111, second terminal 2112, first movable contact plate 213, first drive assembly 215, central shaft 2151, first drive unit 2153, first iron core 21531, and first drive coil 21532;

second contact module 22, second terminal assembly 221, third terminal 2211, fourth terminal 2212, second movable contact plate 223, second drive assembly 225, sleeve shaft 2251, second drive unit 2253, second iron core 22531, and second drive coil 22532; and first resistor 31 and second resistor 32.

DETAILED DESCRIPTION

The embodiments of the present disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are some of the embodiments of the present disclosure, and are to explain the disclosure and cannot be construed as a limitation on the disclosure.

In the description of the present disclosure, it should be understood that orientation or position relationships indicated by the terms such as "on" and "below" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

Before describing the embodiments in detail, it should be understood that the present disclosure is not limited to the detailed structure or element arrangement described in the following or in the accompanying drawings of the present disclosure. The present disclosure may be embodiments implemented in other manners. In addition, it should be understood that the wording and terminology used in this specification are merely used for the purpose of description and should not be limited to definitive interpretation. Similar phrases such as "include", "comprise", and "have" are used herein to include items listed later, their equivalents, and other additional items. In particular, when "an element" is described, a quantity of elements is not limited in the present disclosure, and may include multiple elements.

As shown in FIG. 1 to FIG. 4, the present disclosure provides a relay. The relay includes a housing and multiple contact modules. Each contact module can control a corresponding control circuit. By using multiple contact modules integrated in a same housing, the relay can separately control multiple control circuits.

An interior of the housing has an accommodation space, and each contact module includes a terminal assembly, a movable contact plate, and a drive assembly.

The terminal assembly includes two terminals arranged/disposed spaced apart on the housing, the two terminals are configured to connect to a control circuit, and each terminal at least partially extends into the accommodation space to form a static contact. It should be understood that an end point of the terminal in the accommodation space is a static contact.

The movable contact plate is movably arranged/disposed in the accommodation space, and the movable contact plate is configured to contact the static contacts corresponding to the two terminals to conduct or electrically couple the two terminals.

The drive assembly includes a drive shaft and a drive unit that drives the drive shaft, the drive shaft is connected to the movable contact plate to work integrally, and the drive unit is configured to drive a corresponding movable contact plate by using the drive shaft to contact or be separated from the corresponding two terminals, so as to conduct or disconnect a corresponding control circuit. In an embodiment, the movable contact plate is connected to one end of the drive shaft facing the terminal assembly, so that the movable contact plate is in contact with or separated from the corresponding two terminals.

In the embodiments shown in FIG. 1 to FIG. 4, the relay 99 includes two contact modules, which are respectively a first contact module 21 and a second contact module 22.

A terminal assembly of the first contact module 21 is a first terminal assembly 211, the two terminals included in the first terminal assembly 211 are a first terminal 2111 and a second terminal 2112 that are arranged/disposed spaced apart on the housing 10, and the first terminal 2111 and the second terminal 2112 are configured to be connected to a first control circuit to control on/off of the first control circuit.

A movable contact plate of the first contact module 21 is a first movable contact plate 213. The first movable contact plate 213 is movable between a first position and a second position. The first movable contact plate 213 is in contact with the first terminal 2111 and the second terminal 2112 at the first position, and conducts the first terminal 2111 and the second terminal 2112. The first movable contact plate 213 is separated from the first terminal 2111 and the second terminal 2112 at the second position.

A drive assembly of the first contact module is a first drive assembly 215, the first drive assembly 215 includes a central shaft 2151 and a first drive unit 2153, and the first drive unit 2153 is configured to drive the first movable contact plate 213 to move between the first position and the second position by using the central shaft 2151.

Correspondingly, a terminal assembly of the second contact module 22 is a second terminal assembly 221, the two terminals included in the second terminal assembly 221 are a third terminal 2211 and a fourth terminal 2212 that are arranged/disposed spaced apart on the housing 10, and the third terminal 2211 and the fourth terminal 2212 are configured to be connected to a second control circuit to control on/off of the second control circuit.

A movable contact plate of the second contact module 22 is a second movable contact plate 223, and the second movable contact plate 223 is movable between a third position and a fourth position. The second movable contact plate 223 is in contact with the third terminal 2211 and the fourth terminal 2212 at the third position, and conducts the third terminal 2211 and the fourth terminal 2212. The second movable contact plate 223 is separated from the third terminal 2211 and the fourth terminal 2212 at the fourth position.

A drive assembly of the second contact module is a second drive assembly 225, the second drive assembly 225 includes a sleeve shaft 2251 and a second drive unit 2253, and the second drive unit 2253 is configured to drive the second movable contact plate 223 to move between the third position and the fourth position by using the sleeve shaft 2251.

The central shaft 2151 is arranged/disposed coaxially with the sleeve shaft 2251, and the central shaft 2151 and the sleeve shaft 2251 are movable relative to each other in their axial direction, so that the contact module 21 and the contact module 22 can respectively control on/off of the first control circuit and the second control circuit.

In the present disclosure, multiple drive shafts (e.g., 2151 and 2251) corresponding to multiple contact modules (e.g., 21 and 22) are coaxially arranged, and the multiple drive shafts are axially movable relative to each other, so that the relay can separately control different movable contact plates (for example, 213 or 223) to move by using different drive units (for example, 2153 or 2253), independently control on/off of different control circuits, and occupy a space of about one original relay, thereby facilitating reducing costs and the weight.

In the embodiments shown in FIG. 1 to FIG. 4, the central shaft 2151 and the sleeve shaft 2251 are cylindrical, the sleeve shaft 2251 is a hollow cylinder, and a hollow portion of the sleeve shaft 2251 is a cylindrical channel having a radius greater than that of the central shaft 2151, so that the sleeve shaft 2251 can be sleeved on the central shaft 2151. The sleeve shaft 2251 is sleeved on the central shaft 2151, so that the sleeve shaft 2251 is coaxial with the central shaft 2151, and the sleeve shaft 2251 can move axially relative to the central shaft 2251. It should be understood that the central shaft 2151 and the sleeve shaft 2251 are cylindrical only in an implementation of the present disclosure. A shape of the drive shaft (2151 and 2251) is not limited in the present disclosure. In another embodiment, other shapes may also be set, such as a polygon prism, as long as the sleeve shaft can sleeve on the central shaft 2151 and relative movement can be implemented.

In this embodiment, the relay 99 includes two contact modules (21 and 22), and two drive shafts are arranged/disposed correspondingly, which are respectively a central shaft 2151 and a sleeve shaft 2251. It should be understood that, this is only an implementation of the present disclosure, the relay may further include multiple contact modules, and the relay may include multiple drive shafts correspondingly. The multiple drive shafts include a central shaft and multiple sleeve shafts, and the multiple sleeve shafts are sleeved on the central shaft along the radial direction of the central shaft. That is, the multiple sleeve shafts are a first sleeve shaft, a second sleeve shaft, . . . , an $(N-1)^{th}$ sleeve shaft, and an $N^{th}$ sleeve shaft. A hollow portion of the first sleeve shaft may allow the central shaft to pass through, a hollow portion of the second sleeve shaft may allow the first sleeve shaft to pass through, . . . , a hollow portion of the $N^{th}$ sleeve shaft may allow the $(N-1)^{th}$ sleeve shaft to pass through, so that the first sleeve shaft can be sleeved on the central shaft, the second sleeve shaft can be sleeved on the first sleeve shaft, . . . , and the $N^{th}$ sleeve shaft can be sleeved on the $(N-1)^{th}$ sleeve shaft. The multiple sleeve shafts form multiple layers of structures successively sleeved on the central shaft, and each drive shaft is individually movable in an axial direction relative to another drive shaft. The present disclosure does not limit a quantity of sleeve shafts. Multiple drive shafts arranged/disposed in the relay include a central shaft and at least one sleeve shaft, and the sleeve shaft is sleeved on the central shaft.

In this embodiment, the central shaft 2151 is a solid shaft, and can provide a better support strength. However, this is only used as an implementation of the present disclosure. In another embodiment, the central shaft 2151 may also be hollow, provided that the sleeve shaft 2251 can be sleeved on the central shaft 2151. Whether the central shaft 2151 is a solid shaft is not limited in the present disclosure.

Figure 3:
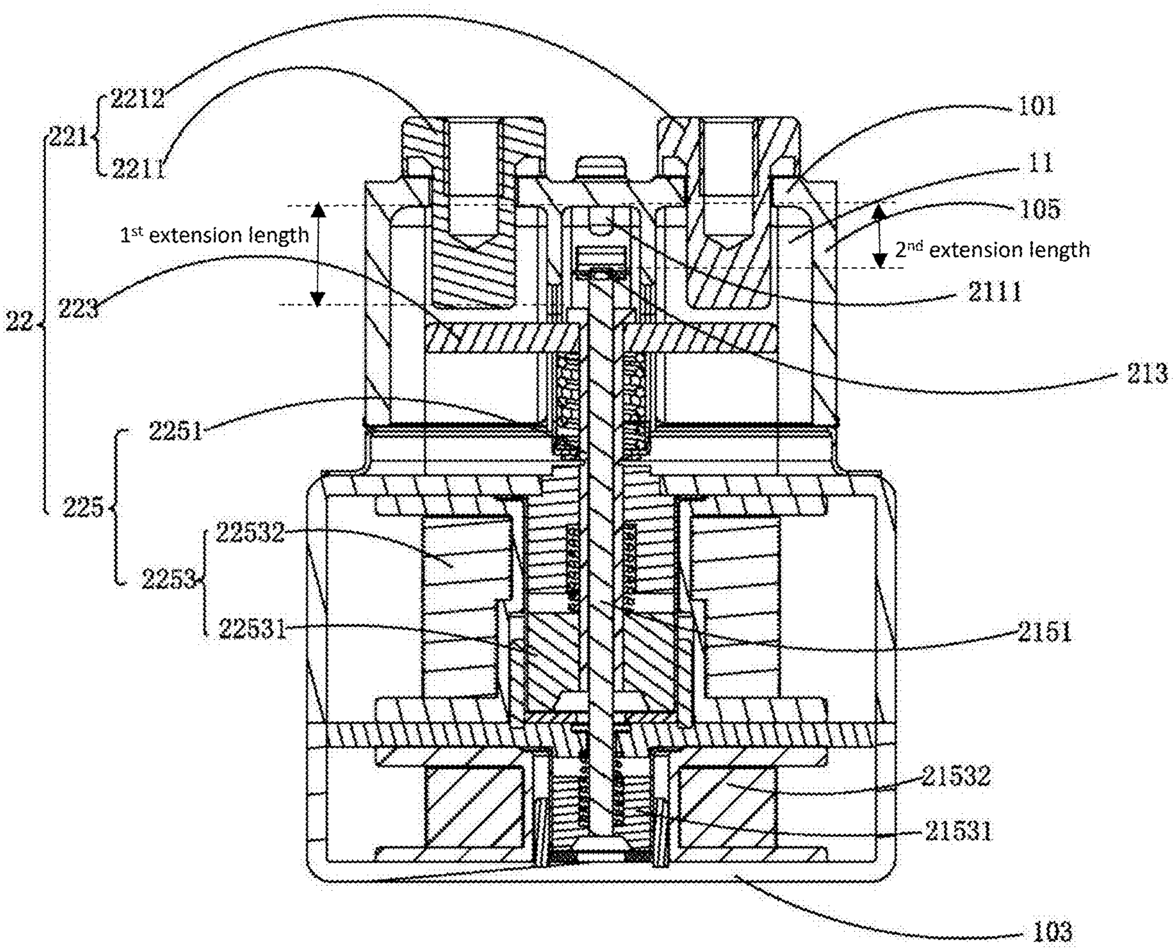
FIG. 3 is a cross-sectional view of the relay shown in FIG. 1 along A-A.
Figure 4:
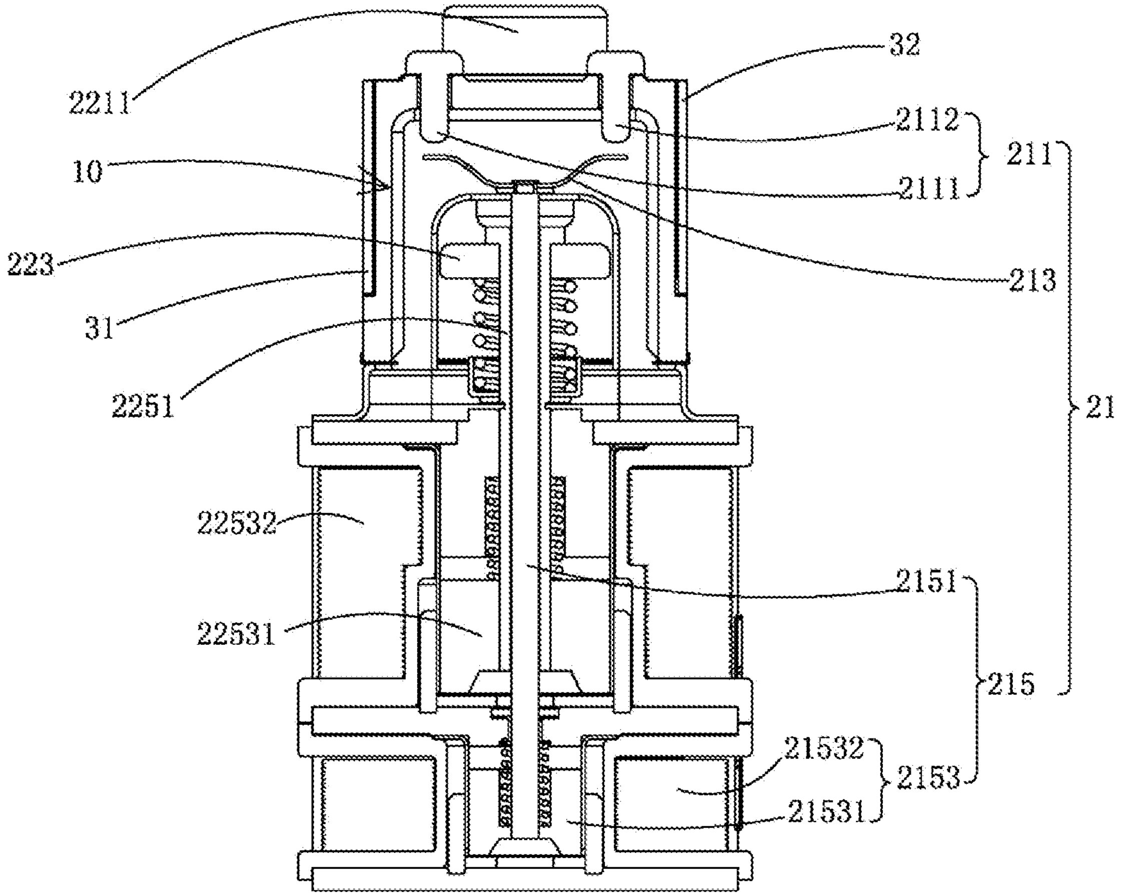
FIG. 4 is a cross-sectional view of the relay shown in FIG. 1 along B-B.

As shown in FIG. 3, the housing 10 includes a top plate 101, a bottom plate 103, and a side plate 105 connected between the top plate 101 and the bottom plate 103. The top plate 101, the bottom plate 103, and the side plate 105 enclose to form an accommodation space 11. According to an embodiment of the present disclosure, the top plate 101, the bottom plate 103, and the side plate 105 are sealed and connected, and the accommodation space 11 is a sealed space. Therefore, an external environment is prevented from affecting the relay 99, a working environment of the relay 99 is more stable, an electric arc generated when the relay 99 is turned on or off is prevented from causing a potential safety issue, and a matching arc extinguishing design of the relay 99 is also facilitated.

In the illustrated embodiment, axial directions of the central shaft 2151 and the sleeve shaft 2251 are perpendicular to the top plate 101, and the first terminal assembly 211 and the second terminal assembly 221 are staggered on the top plate 101. A central connection line between the first terminal 2111 and the second terminal 2112 and a central connection line between the third terminal 2211 and the fourth terminal 2212 intersects at an intersection point between the axis of the central shaft 2151 and the top plate 101, is not blocked by the third terminal 2211 and the fourth terminal 2212 in a process in which the first movable contact plate 213 moves to be in contact with the first terminal 2111 and the second terminal 2112, and is not blocked by the first terminal 2111 and the second terminal 2112 in a process in which the second movable contact plate 223 moves to be in contact with the third terminal 2211 and the fourth terminal 2212.

The axial directions of the multiple drive shafts of the relay are perpendicular to the top plate of the housing, multiple terminal assemblies are staggered on the top plate, the multiple drive shafts are in contact with or separated from the corresponding terminal assemblies in the axial direction, and on/off of the multiple contact modules does not affect each other.

It should be understood that the multiple terminal assemblies are staggered on the top plate, which is merely used as an implementation of the present disclosure. In another embodiment, the multiple terminal assemblies may further be arranged/disposed in another manner. For example, the housing further includes multiple steps, a step surface of the step is perpendicular to the axial direction of the drive shaft, and the terminal is arranged on the step surface. The arrangement manner of the terminal assembly is not limited in the present disclosure as long as the multiple movable contact plates can be contacted or separated from the corresponding terminal assemblies in the axial direction, and on/off of multiple contact modules does not affect each other.

Correspondingly, in the embodiments shown in FIG. 1 to FIG. 4, the first movable contact plate 213 is correspondingly arranged/disposed with the first terminal assembly 211, and the second movable contact plate 223 is correspondingly arranged/disposed with the second terminal assembly, so that the first movable contact plate 213 is offset from the second movable contact plate 223 by an angle, that is, projections of the first movable contact plate 213 and the second movable contact plate 223 on the top plate 101 are not overlapped, the projection of the first movable contact plate 213 on the top plate 101 is corresponding to the central connection line between the first terminal 2111 and the second terminal 2112, and the projection of the second movable contact plate 223 on the top plate 101 is corresponding to the central connection line between the third terminal 2211 and the fourth terminal 2212. Therefore, the contact between the first movable contact plate 213 and the corresponding first terminal assembly 211 is not affected by the second terminal assembly 221, and the contact between the second movable contact plate 223 and the corresponding second terminal assembly 221 is not affected by the first terminal assembly 211.

For ease of description, a length by which the terminal extends into the accommodation space is defined as an extension length, that is, a distance between a static contact corresponding to the terminal and the top plate is the extension length of the terminal. In the illustrated embodiment, the first movable contact plate 213 is arranged/disposed on an end portion of the central shaft 2151 facing the top plate 101, and the sleeve shaft 2251 is blocked by the first movable contact plate 213 when moving toward the top plate 101, so that the second movable contact plate 223 arranged/disposed on an end portion of the sleeve shaft 2251 facing the top plate 101 cannot exceed the first movable contact plate 213 in the direction toward the top plate 101. To prevent the conduction of the second contact module 22 from being affected by the first movable contact plate 213, in this embodiment, extension lengths of the third terminal 2211 and the fourth terminal 2212 that are corresponding to the sleeve shaft 2251 are greater than extension lengths of the first terminal 2111 and the second terminal 2112 that are corresponding to the central shaft 2151, that is, the first position is closer to the top plate 101 than the third position, so that the first movable contact plate 213 does not block the second movable contact plate 223 from moving to the third position when being in contact with the first terminal assembly 211 at the first position, and the second contact module 22 can normally conduct the second control circuit.

When the first contact module 21 needs to disconnect the first control circuit, and the second contact module 22 needs to conduct the second control circuit, because the first movable contact plate 213 is not in contact with the first terminal 2111 and the second terminal 2112 at the third position, the first movable contact plate 213 does not block the second movable contact plate 223 from moving to the third position, so that the second contact module 22 can normally conduct the second control circuit when the first contact module 21 disconnects the first control circuit. According to an embodiment of the present disclosure, the second position of the first movable contact plate 213 is closer to the top plate 101 than the third position of the second movable contact plate 223, so that when the second movable contact plate 223 is at the third position, the first movable contact plate 213 can be safely disconnected.

Similarly, the relay may include multiple contact modules. In multiple drive shafts, a terminal corresponding to the central shaft has a shortest extension length, and a terminal corresponding to a sleeve shaft that is closer to the central shaft along the radial direction of the central shaft has a shorter extension length, thereby ensuring that each contact module is normally conducted without being affected by another contact module.

In the embodiments shown in FIG. 1 to FIG. 4, the first movable contact plate 213 and the second movable contact plate 223 are driven in an electromagnetic driving manner, and the first drive unit 2153 and the second drive unit 2253 are arranged/disposed in the accommodation space 11.

The first drive unit 2153 includes a first iron core 21531 and a first drive coil 21532. The first iron core 21531 is arranged at an end of the central shaft 2151 away from the first movable contact plate 213, the first iron core 21531 moves integrally with the central shaft 2151, and the first drive coil 21532 is configured to drive the first iron core 21531 to move in the axial direction. Details of the electromagnetic driving are not described herein. The first drive coil 21532 is arranged/disposed on the bottom plate 103. When the first drive coil 21532 is provided with a current in a first direction, the first iron core 21531 is moved upward by a magnetic field force, and drives the first movable contact plate 213 to move to the first position. When the first control circuit needs to be disconnected, the first drive coil 21532 may be provided with a current in a second direction opposite to the first direction, and the first iron core 21531 is subjected to a downward magnetic field force, so that the first movable contact plate 213 is separated from the first terminal 2111 and the second terminal 2112.

The second drive unit 2253 includes a second iron core 22531 and a second drive coil 22532. The second iron core 22531 is arranged/disposed at an end of the sleeve shaft 2251 away from the second movable contact plate 223, the second iron core 22531 moves integrally with the sleeve shaft 2251, the second drive coil 22532 and the first drive coil 21532 are staggered in the axial direction, and the second drive coil 22532 is located above the first drive coil 21532. When the second drive coil 22532 is provided with a current in a third direction, the second iron core 22531 is moved upward by a magnetic field force, and drives the second movable contact plate 223 to move to the third position. When the second control circuit needs to be disconnected, the second drive coil 22532 may be provided with a current in a fourth direction opposite to the third direction, and the second iron core 22531 is subjected to a downward magnetic field force, so that the second movable contact plate 223 is separated from the third terminal 2211 and the fourth terminal 2212.

An end of the central shaft 2151 away from the first movable contact plate 213 may be connected to the first iron core 21531 by extending out of the sleeve shaft 2251. Therefore, the first iron core 21531 is arranged/disposed closer to the bottom plate 103 than the second iron core 22531. However, the first drive coil 21532 and the second drive coil 22532 may be arranged/disposed respectively corresponding to the first iron core 21531 and the second iron core 22531. Therefore, the first drive coil 21532 is arranged/disposed closer to the bottom plate 103 than the second drive coil 22532. Therefore, the first drive coil 21532 and the second drive coil 22532 can drive the first iron core 21531 and the second iron core 22531 independently, so as to flexibly control on/off of the first control circuit and/or the second control circuit.

In other embodiments, the relay includes two or more contact modules, that is, multiple sleeve shafts are arranged/disposed. Similarly, multiple drive coils corresponding to the multiple contact modules are staggered in the axial direction of the drive shaft. In the multiple drive coils, a distance between a drive coil corresponding to the central shaft and the bottom plate of the housing is the shortest, and a drive coil corresponding to a sleeve shaft that is closer to the central shaft along the radial direction of the central shaft is closer to the drive coil corresponding to the central shaft. It should be understood that the quantity of contact modules arranged on the relay in the present disclosure is not limited, provided that a central shaft and at least one sleeve shaft are included, drive coils corresponding to the central shaft and the sleeve shaft are staggered in the axial direction, and the drive coil corresponding to the central shaft is arranged closer to the bottom plate than the drive coil corresponding to the sleeve shaft, so as to implement that each drive coil independently controls a corresponding drive shaft.

In the embodiments shown in FIG. 1 to FIG. 4, the relay 99 may be applied to a charging circuit of an electric vehicle. The relay 99 further includes a first resistor 31. The first terminal 2111 is electrically connected to the third terminal 2211 by using the first resistor 31, and the second terminal 2112 is electrically connected to the fourth terminal 2212. If the second control circuit connected to the third terminal 2211 and the fourth terminal 2212 is a primary charging circuit, the first terminal 2111, the second terminal 2112, and the first resistor 31 are connected to the second control circuit in parallel as a precharging circuit of the electric vehicle. When the electric vehicle is being charged, the second contact module 22 disconnects the primary charging circuit, the first contact module 21 conducts the precharging circuit, the first resistor 31 lowers a current of the charging circuit of the electric vehicle, and gradually charges a capacitor in the charging circuit of the electric vehicle. When a voltage difference between a voltage of the capacitor and a voltage of a battery is relatively small, the second contact module 22 conducts the primary charging circuit, and the first contact module 21 disconnects the precharging circuit. The relay 99 integrates a primary charging circuit relay, a precharging circuit relay, and a precharging resistor that are in the charging circuit of the electric vehicle, so as to reduce a space occupied by a distribution element in the electric vehicle, thereby facilitating lightweight of the electric vehicle and reducing costs.

In this embodiment, the first resistor 31 is arranged/disposed on the housing 10, and the first resistor 31 is arranged/disposed against the housing 10, thereby further reducing an occupied space. How the first resistor 31 is arranged on the housing 10 is not limited in the present disclosure. In an implementation, the first resistor 31 is a resistor wire arranged around the housing 10, and is conveniently arranged. In another implementation, the first resistor 31 is printed on the housing 10, and the first resistor 31 contacts the housing 10 more closely, which facilitates heat dissipation of the first resistor 31 by using the housing 10.

Further, the side plate 105 has multiple planes, and the first resistor 31 is arranged on at least one plane. As shown in FIG. 1, the first resistor 31 may be directly arranged on one plane in a printing manner, so that another function member (such as an arc-extinguishing magnet) may be arranged on another plane of the side plate 105.

In this embodiment, the relay 99 further includes a second resistor 32, and the third terminal 2211 is electrically connected to the fourth terminal 2212 by using the second resistor 32, so as to improve a precharging resistance value in the precharging circuit.

According to an embodiment of the present disclosure, the housing 10 is a ceramic housing, which can provide excellent sealing performance and insulation performance, and can effectively dissipate heat of the first resistor 31 and the second resistor 32 arranged on the housing 10.

In conclusion, the present disclosure provides a relay, including a housing and multiple contact modules, multiple drive shafts corresponding to the multiple contact modules are arranged coaxially, and the multiple drive shafts are relatively movable in an axial direction. Therefore, the relay may separately control different movable contact plates to move by using different drive units, independently control on/off of different control circuits, and occupy a space of about one original relay, thereby facilitating reducing costs and the weight.

The concepts described herein may be implemented in other forms without departing from their spirit and characteristics. The embodiments applied for shall be considered as examples and not limiting. Therefore, the scope of the present disclosure is determined by the appended claims rather than by the foregoing descriptions. Any change within the literal meaning and equivalence of the claims shall fall within the scope of these claims.

In the description of this specification, the description of the reference terms "an embodiment", "some embodiments", "an example", "a specific example", "some examples," and the like means that features, structures, materials or characteristics described in combination with the embodiment(s) or example(s) are included in at least one embodiment or example of the present disclosure. In this specification, some descriptions of the foregoing terms do not necessarily refer to the same embodiment or example. In addition, the described features, structures, materials, or characteristics may be combined in a proper manner in any one or more of the embodiments or examples.

Although the embodiments of the present disclosure have been shown and described above, it may be understood that the foregoing embodiments are some of the embodiments of the present disclosure, and cannot be understood as a limitation on the present disclosure. A person of ordinary skill in the art may make changes, modifications, replacements, and variations to the foregoing embodiments within the scope of the present disclosure without departing from the principle and objectives of the present disclosure.

What is claimed is:

1. A relay, comprising a housing, a first resistor, and a plurality of contact modules, an interior of the housing having an accommodation space, a plurality of drive shafts respectively corresponding to the plurality of contact modules and being disposed coaxially, and the plurality of drive shafts being movable in an axial direction of the drive shafts, and wherein the plurality of contact modules comprise a first contact module and a second contact module, the first contact module comprises a first terminal and a second terminal, the second contact module comprises a third terminal and a fourth terminal, the first terminal of the first contact module is electrically connected to the third terminal of the second contact module via the first resistor, and the second terminal of the first contact module is electrically connected to the fourth terminal of the second contact module, and each of the contact modules comprises:

a terminal assembly, comprising two terminals spaced apart from each other and disposed on the housing, each of the two terminals at least partially extending into the accommodation space to form one of two static contacts;

a movable contact plate, movably disposed in the accommodation space, the movable contact plate being configured to contact the two static contacts to electrically couple the two terminals; and a drive assembly, comprising a drive shaft of the plurality of drive shafts and a drive unit that drives the drive shaft, the drive shaft being connected to the movable contact plate, and the drive unit being configured to drive the movable contact plate via the drive shaft to contact or be separated from the two terminals.

2. The relay according to claim 1, wherein the plurality of drive shafts comprise a central shaft and at least one sleeve shaft, the at least one sleeve shaft comprises a hollow cylinder, and the at least one sleeve shaft is sleeved on the central shaft.

3. The relay according to claim 2, wherein a first terminal corresponding to the at least one sleeve shaft extends into the accommodation space by a first extension length, a second terminal corresponding to the central shaft extends into the accommodation space by a second extension length, and the first extension length is greater than the second extension length.

4. The relay according to claim 3, wherein the housing comprises a top plate, a bottom plate, and a plurality of side plates connected between the top plate and the bottom plate, and the top plate, the bottom plate, and the plurality of side plates form the accommodation space;

the drive unit is disposed in the accommodation space, the drive unit comprises an iron core and a drive coil, the iron core is disposed at an end of each of the drive shafts away from the movable contact plate, and the drive coil is configured to drive the iron core to move in the axial direction; and a first drive coil corresponding to the at least one sleeve shaft and a second drive coil corresponding to the central shaft are staggered in the axial direction, and the second drive coil is disposed closer to the bottom plate than the first drive coil.

5. The relay according to claim 2, wherein the at least one sleeve shaft comprises a plurality of sleeve shafts, and the plurality of sleeve shafts are successively sleeved on the central shaft in a radial direction of the central shaft.

6. The relay according to claim 5, wherein a terminal corresponding to one of the sleeve shafts extends into the accommodation space by an extension length, a third extension length of the terminal corresponding to a first sleeve shaft that is closer to the central shaft in the radial direction of the central shaft is shorter than a fourth extension length of the terminal corresponding to a second sleeve shaft that is farther from the central shaft in the radial direction of the central shaft.

7. The relay according to claim 6, wherein the housing comprises a top plate, a bottom plate, and a plurality of side plates connected between the top plate and the bottom plate, and the top plate, the bottom plate, and the plurality of side plates form the accommodation space;

the drive unit is disposed in the accommodation space, the drive unit comprises an iron core and a drive coil, the iron core is disposed at ends of the drive shafts away from the movable contact plate, and the drive coil is configured to drive the iron core to move in the axial direction; and a plurality of drive coils corresponding to the plurality of contact modules are staggered in the axial direction, a first drive coil corresponds to the first sleeve shaft that is closer to the central shaft in the radial direction of the central shaft, a second drive coil corresponds to the second sleeve shaft that is farther from the central shaft in the radial direction of the central shaft, a third drive coil corresponds to the central shaft, a distance between the bottom plate and the third drive coil is shorter than those between the bottom plate and the first drive coil and the second drive coil, and the first drive coil is closer to the third drive coil than the second drive coil.

8. The relay according to claim 2, wherein the housing comprises a top plate, and a plurality of terminal assemblies respectively corresponding to the plurality of contact modules are staggered on the top plate.

9. The relay according to claim 1, further comprising a second resistor, wherein the third terminal is electrically connected to the fourth terminal via the second resistor.

10. The relay according to claim 1, wherein the first resistor is disposed on the housing.

11. The relay according to claim 10, wherein the first resistor is printed on the housing.

12. The relay according to claim 10, wherein the housing comprises a top plate and a side plate, the first terminal, the second terminal, the third terminal, and the fourth terminal are disposed on the top plate, the side plate has a plurality of planes, and the first resistor is disposed on at least one of the planes.

13. The relay according to claim 1, wherein the housing is a ceramic housing.

* * * * *